United States Patent
Hansen

(10) Patent No.: US 10,273,419 B2
(45) Date of Patent: *Apr. 30, 2019

(54) METHOD FOR PRODUCING NAPHTHENIC PROCESS OILS BY HYDROGENATION

(71) Applicant: KLAUS DAHLEKE KG, Hamburg (DE)

(72) Inventor: Nils Hansen, Hamburg (DE)

(73) Assignee: Klaus Dahleke KG, Hamburg (DE)

( * ) Notice: Subject to any disclaimer, the term of this patent is extended or adjusted under 35 U.S.C. 154(b) by 64 days.

This patent is subject to a terminal disclaimer.

(21) Appl. No.: 15/157,556

(22) Filed: May 18, 2016

(65) Prior Publication Data

US 2016/0333279 A1    Nov. 17, 2016

Related U.S. Application Data

(63) Continuation of application No. 13/385,580, filed on Oct. 14, 2010, now Pat. No. 9,371,495.

(30) Foreign Application Priority Data

Feb. 17, 2010  (EP) .................................... 10001605

(51) Int. Cl.
| | | |
|---|---|---|
| C08L 9/06 | (2006.01) | |
| C09D 5/00 | (2006.01) | |
| C09D 11/02 | (2014.01) | |
| C10G 45/44 | (2006.01) | |
| C10G 45/46 | (2006.01) | |
| C10G 45/48 | (2006.01) | |
| C10G 45/50 | (2006.01) | |
| B01J 23/883 | (2006.01) | |
| C10M 101/02 | (2006.01) | |

(52) U.S. Cl.
CPC ............ *C10G 45/50* (2013.01); *B01J 23/883* (2013.01); *C08L 9/06* (2013.01); *C09D 5/008* (2013.01); *C09D 11/02* (2013.01); *C10G 45/44* (2013.01); *C10G 45/46* (2013.01); *C10G 45/48* (2013.01); *C10M 101/02* (2013.01); *C10G 2300/1096* (2013.01); *C10G 2300/30* (2013.01); *C10G 2300/4006* (2013.01); *C10G 2300/4012* (2013.01); *C10G 2400/30* (2013.01); *C10M 2203/1065* (2013.01); *C10N 2240/40* (2013.01)

(58) Field of Classification Search
CPC .................................................. C10G 2300/30
See application file for complete search history.

(56) References Cited

U.S. PATENT DOCUMENTS

| | | |
|---|---|---|
| 3,912,618 A | 10/1975 | Dryer |
| 4,521,296 A | 6/1985 | Kunihiro |
| 5,091,007 A | 2/1992 | Hansen |
| 6,103,808 A | 8/2000 | Hashimoto |
| 2005/0272850 A1 | 12/2005 | Jois |

FOREIGN PATENT DOCUMENTS

| | | |
|---|---|---|
| DE | 2343238 | 3/1974 |
| EP | 0214717 | 3/1987 |
| EP | 0417980 B1 | 6/1997 |
| ES | 2 004 385 | 1/1989 |
| WO | WO9214779 A1 | 9/1992 |

OTHER PUBLICATIONS

Pier, M., Zeitschrift für Elektrochemie und angewandte physikalische Chemie, 53, 1949, 291-301.
Pecoraro, T.A., Chianelli, R.R., Journal of Catalysis, 67, 1981, 430-445.
Speight, J.G., "The Chemistry and Technology of Petroleum", CRC Press, 1999, ISBN 0824702175.
Weisser, et al., "Sulphide Catalysts, their Properties and Applications", Pergamon Press, Oxford, N.Y, & Friedr. Vieweg + Sohn, Braunshweig, 1973, ISBN 00801755 11-14, 91-101.
Harris, S., Chianelli, R.R., Journal of Catalysis, 98, 1986, 17-31.
Speight, J.G., "The Refinery of the Future", Elsevier, 2011, 97-99.
"Hydrodesulfurierung—Katalysatoren für die Erdöl-Entschwefelung", Nachr. Chem. Tech. Lab. 36, 1988, 18, 23-26.

*Primary Examiner* — Peter F Godenschwager
(74) *Attorney, Agent, or Firm* — Nash and Titus, LLC

(57) ABSTRACT

The object of the invention is a method for producing naphthenic process oils that have a high content of naphthenic carbon atoms of 20-60 wt % and a low content of polycyclic aromatics of less than 3 wt %, determined in accordance with IP 346, by the hydrogenation of a process oil educt that has a high content of polycyclic aromatics. The method in accordance with the invention enables secondary extracts, such as are formed in the production of label-free process oils, even in a mixture with primary extracts, to be utilized in an economically meaningful way. The resulting process oils are likewise label-free, so that the use of PCA-containing process oils can be reduced and less of these substances will get into the environment. Through this the environment and in particular health are less stressed. In addition, the starting substances in this way can lead to a different use and no longer have to be added to heating oil. By avoiding heating oil, $CO_2$ emissions are also reduced. Also, through the direct hydrogenation of DAE, high value naphthenic process oils are obtained by the method in accordance with the invention. The process oils that are obtained contain surprisingly high amounts of naphthenic hydrocarbon compounds. In addition, an object of the invention is the use of the process oils produced in accordance with the invention as a plasticizer or extender oil for natural and synthetic rubber mixtures or thermoplastic elastomers.

6 Claims, 3 Drawing Sheets

METHOD FOR PRODUCING NAPHTHENIC PROCESS OILS BY HYDROGENATION

The object of the invention is a method for producing naphthenic process oils with a high content of naphthenic hydrocarbons and a content of polycyclic aromatics that is less than 3 wt % in accordance with IP 346, as well as the use of these process oils.

Process oils are generally understood to be hydrocarbon mixtures that boil in the lubricating oil range, but are usually not used as, and also not in combination with, lubricating oils. Process oils are obtained in the refining of petroleum. The crude oil is subjected to an atmospheric distillation, separating all products that boil up to about 350° C. at normal pressure. A mixture of bitumens, asphaltenes, waxes, and heavy oils is obtained as residue after the distillation. The heavy oils are processed further to various products, which in addition to lubricating oils also include the process oils, which are chiefly used as plasticizers.

The process oils differ in each case according to their content of aromatic carbon atoms ($C_A$), naphthenic carbon atoms ($C_N$), and paraffinic carbon atoms ($C_P$), measured in accordance with ASTM D 2140. Aromatic process oils in some case have undesirably high amounts of polycyclic aromatics (PCAs). Polycyclic aromatics are understood to be compounds with more than two condensed aromatic nuclei. Since the polycyclic aromatics, such as benzo[a]pyrene, are suspected of being carcinogenic, even in the past process oils with a high PCA content have been used only to a limited extent.

According to European Guideline 769/76, augmented by Guideline 69/2005 of Nov. 16, 2005, the use of process oils is now only allowed if these process oils have a content of polycyclic aromatics that is less than 3 wt %, measured by the method of IP 346.

Besides the process oils that have a high aromatic content, there is another group of frequently used process oils, the naphthenic oils. Naphthenic oils are characterized by a high content of cycloalkanes, but can also have a higher content of aromatic hydrocarbon compounds than paraffinic oils. Correspondingly, naphthenic oils exhibit better solvent properties with respect to rubber than paraffinic oils and can be processed better. Naphthenic process oils for medicinal use usually contain no or only a small content of aromatics.

The corresponding process oils that still contain more than 3 wt % polycyclic aromatics in accordance with IP 346 must in the future either be disposed of as hazardous waste or, if need be, added to heating oil, where this has the disadvantage that higher sulfur emissions arise when the heating oil is burned. Because of the changed legislation such products in the future therefore may no longer be added to heating oil, in order to reduce sulfur emissions. If need be, combustion in plants with special filters will still be permitted. Moreover, extraction residues with a high content of polycyclic aromatics are formed in the production of process oils with a low content of PCAs, for example the process oils TDAE and MES. These extraction residues in the future also must be disposed of or added to heating oil.

One possibility for obtaining process oils with a low content of polycyclic aromatics is to reextract a primary extract that is obtained by extraction of a lubricating oil distillate that derives from mineral oil. One such process is described in EP 0 417 980 B1. The process oil that is obtained in this case, for example TDAE, has a polycyclic aromatic content that is less than 3 wt % in accordance with IP 346. However, a disadvantage of this process is that a product with a high concentration of polycyclic aromatics, from up to 15 and even over 20 wt %, is obtained as secondary extract, i.e., as the "bottom phase," which is taken from the second extraction column.

The task of this invention therefore is to make available a method that allows the processing of process residues that have a high PCA content, where the resulting process oils should be label-free [nonhazardous], i.e., have a PCA content of less than 3 wt %, determined in accordance with IP 346. The method should allow an environmentally friendly use of DAE, which is subject to mandatory labeling, the secondary extracts, and the extraction residues from the production of other process oils. Moreover, the resulting process oils should be of such a qualitatively high grade that they satisfy the standard requirements for the current process oils, for example as plasticizers or extender oils in rubbers or rubber mixtures, as oils in printing inks, as transformer oils, or as feedstock for the production of high grade oils, for example TDAE, and/or as metalworking oils.

The task is solved in accordance with the invention by a method for producing naphthenic process oils that have a carbon distribution $C_A$ to $C_N$ to $C_P$ of 0-30 wt % to 20-65 wt % to 20-55 wt %, determined in accordance with ASTM D 2140, and a content of polycyclic aromatics (PCAs) of less than 3 wt % in accordance with IP 346, characterized in that a process oil educt that has a content of polycyclic aromatics of at least 3 wt %, determined in accordance with IP 346, and a content of naphthenic hydrocarbon atoms $C_N \leq 25$ wt %, is hydrogenated with hydrogen using a metal catalyst at temperatures from 200-400° C. and pressures from 80-250 bar.

In addition, an object of the invention is the use of a process oil that is produced in accordance with the invention as a plasticizer or extender oil for rubbers or rubber mixtures that are based on natural and synthetic rubbers, or for thermoplastic elastomers, as a raw material for technical or medicinal white oils, as printing ink oils, as a release agent for architectural coatings, or industrial fat production, transformer oils, or special metalworking oils.

Further embodiments are the object of the dependent claims or are described below.

To conduct the method in accordance with the invention, a process oil educt is passed with hydrogen over a metal catalyst under the indicated conditions. Preferably, transition metal catalysts on a support are used as the catalyst. Preferred metal catalysts are cobalt, nickel, molybdenum, chromium, vanadium, nickel-molybdenum catalysts, chromium-vanadium catalysts, metal oxides, metal sulfides, or combinations thereof. The substances that are conventional in industry such as aluminum oxide or zeolites are tried-and-true materials as support substances. Basically, conventional hydrogenation catalysts can be used for the hydrogenation.

The hydrogenation is preferably carried out at temperatures of 250-400° C., especially preferably 300-375° C. The reactor is preferably operated at a pressure of 80-200 bar. The hydrogenation is preferably carried out with an average residence time of 6-60 min.

When the method in accordance with the invention is carried out, process oils that have a content of naphthenic hydrocarbon atoms $C_N$ of 30-65 wt %, determined in accordance with ASTM D 2140, are obtained. Surprisingly, process oils whose $C_N$ content is >40 or 45 wt %, see ASTM D 2140, can be obtained with the method in accordance with the invention. According to the current prevailing opinion and in correspondence with ASTM D 2140, a maximum content of 45 wt % naphthenic hydrocarbon atoms is possible in process oils. The resulting process oils in addition have a content of less than 3 wt % polycyclic aromatics, determined in accordance with IP 346.

Process oil educts that have a polycyclic aromatic content >3 wt %, determined in accordance with IP 346, preferably a polycyclic aromatic content of 10-30 wt %, are used as the educt for the hydrogenation. Such suitable process oil educts are, for example, the secondary extracts that are obtained in the production of TDAE or MES. One such process is known from EP 0 417 980 B1. The secondary extract obtained there can be used as starting material for the method in accordance with the invention. Specific hydrocarbon distributions in the products can be tailored through the choice of the educt and possibly by mixing different starting extracts. DAE (distillate aromatic extract) is also a suitable educt for the method in accordance with the invention.

To obtain a traditional TDAE, usually crude oil is subjected to atmospheric distillation to separate gas, naphtha, and kerosene fractions. The atmospheric residue is separated into a vacuum residue and one or more distillates in a vacuum distillation. The distillate is then, in an extraction with a suitable solvent, separated into a raffinate and an extract (primary extract), the DAE. Base oil and waxes are obtained from the raffinate. A second extraction of the primary extract affords the TDAE, and with an appropriate choice of reaction conditions, one can obtain a process oil that has a polycyclic aromatic content ≤3 wt %. In addition, another extract, the secondary extract, is formed in the second extraction. This secondary extract can be used by itself or in a mixture, for example with other extracts or process oils, as the educt for the method in accordance with the invention and is correspondingly hydrogenated in an additional process step.

DAE (distillate aromatic extract) is also suitable as the educt for the production method in accordance with the invention [for] production of process oils. DAEs are highly aromatic process oils. Examples of DAEs are the products that can be obtained from Klaus Dahleke KG:

Tudalen®65 ($C_A$=40 wt %, $C_N$=25 wt %, $C_P$=35 wt %; PCA in accordance with IP346>15 wt %)

Tudalen®81 ($C_A$=43 wt %, $C_N$=24 wt %, $C_P$=33 wt %; PCA in accordance with IP346>15 wt %).

The naphthenic process oils can be obtained in high yields by the method in accordance with the invention. For example, high yields up to 100% were obtained in the hydrogenation of DAE. With appropriate conduct of the process, environmentally hazardous process oils that are subject to mandatory labeling are no longer produced. Rather, naphthenic label-free process oils can be obtained from the labeling-mandatory and environmentally questionable DAE via the method in accordance with the invention.

In accordance with the invention it is also possible to use other substances as process oil educts, provided the sum of $C_A$ and $C_N$ in the process oil educt is higher than the sum of the desired $C_N$ content plus the residual content of aromatics and/or they have a content of polycyclic aromatics >3 wt %, measured in accordance with IP 346. For example, extracts, mineral oil fractions or process oils, for which the sum of $C_A$ plus $C_N$ is 55, can be used as process oil educts.

In one embodiment of the method, an educt mixture of DAE and secondary extract is used. It turned out that the glass transition point $T_g$ of the process oils can be set through the choice of educt mixture. Surprisingly, a process oil produced in accordance with the invention from a DAE/secondary extract mixture, in spite of having the same $C_A$ content, has different $T_g$ values, depending on the starting mixture. The $T_g$ can vary in this case, for example, between −52° C. and +45° C. Mixtures of 75%:25% to 25%:75% secondary extract to DAE are preferably used. Control of the dynamic properties of the subsequent rubber product is possible through the choice of a process oil with a specific glass transition temperature.

The method in accordance with the invention thus allows a process oil educt that has a high content of polycyclic aromatics and thus may no longer be sold in accordance with the new EU Guideline and anyway is questionable from the standpoint of health and environmental policy, for a high grade product. Moreover, the starting materials can in this way be sent to a different use and no longer have to be added to heating oil. By avoiding heating oil, the $CO_2$ emissions are also reduced. Surprisingly, the resulting naphthenic process oil, in spite of the low content of PCA, still has a high content of aromatic hydrocarbon atoms $C_A$, which preferably is between 0 and 30 wt %, determined in accordance with ASTM D 2140, in each case according to the reaction conditions. Preferably the sum of $C_A$ and $C_N$ is between 50 and 70. A high content of aromatic hydrocarbon compounds in process oil improves the wet skid resistance of an automobile tire and the cornering ability on dry roads, while a high $C_N$ content in the process oil improves the rolling resistance of an automobile tire.

The process oil produced in accordance with the invention is used as a plasticizer or extender oil for rubbers and rubber mixtures that are based on natural and synthetic rubbers, or thermoplastic elastomers. It likewise can also be used as raw material for medicinal or industrial white oils, as printing ink oil, for example for colored and black inks in newsprint, transformer oil, as release agent in architectural coatings, or as special metalworking oils, and it also finds use in industrial fat production. The process oil produced in accordance with the invention is especially preferably used as a plasticizer in tires or industrial rubber goods, as white oil or as metalworking oil, for example in the drawing of copper wire.

If a DAE is used as the educt for the method in accordance with the invention, the process oils produced in accordance with the invention are preferably used as a plasticizer or extender oil for rubbers or rubber mixtures that are based on natural and synthetic rubbers, especially preferably tires.

The method in accordance with the invention is illustrated by means of the figures by way of example. Here:

Figure 1:
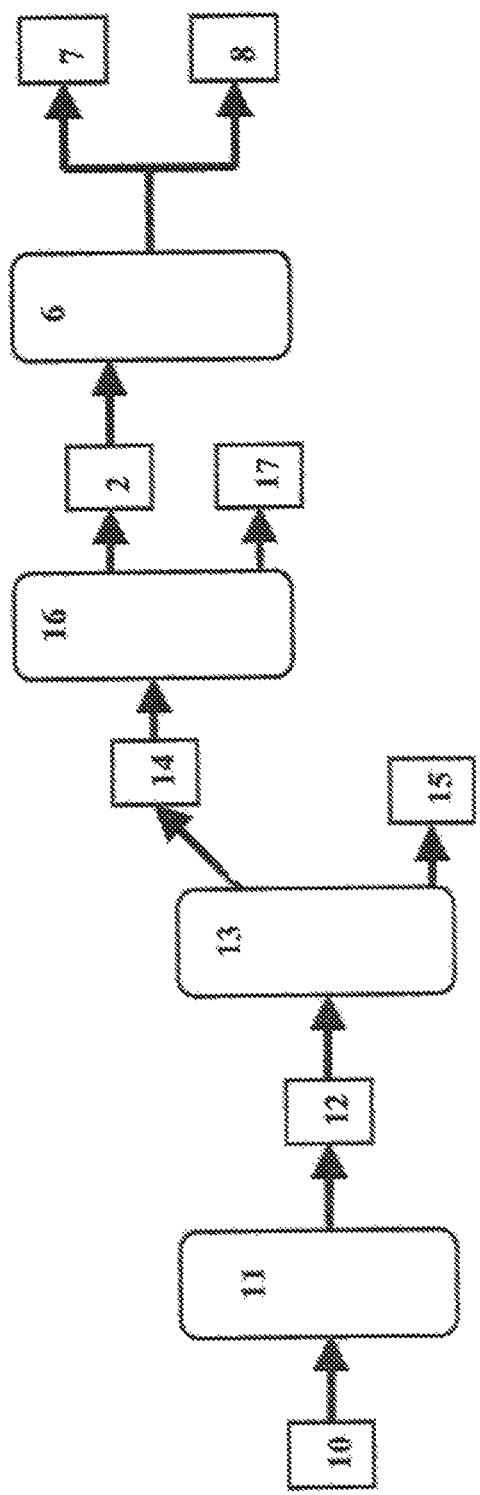
FIG. 1 shows a flowchart of the extraction process known from the prior art for production of TDAE and MES.

FIG. 1 shows the second extraction step of the conventional extraction for production of TDAE or MES. The primary extract 2 is sent to an extraction column 1. The primary extract is a mixture of different hydrocarbon compounds, including aromatic hydrocarbon compounds and polycyclic aromatics. At the same time solvent is supplied to the extraction column via line 3. The raffinate 4, for example a TDAE or MES, is taken from the top of the column. At the same time a secondary extract 5, which has a high content of polycyclic aromatics, is taken from the bottom of the column.

Figure 2:
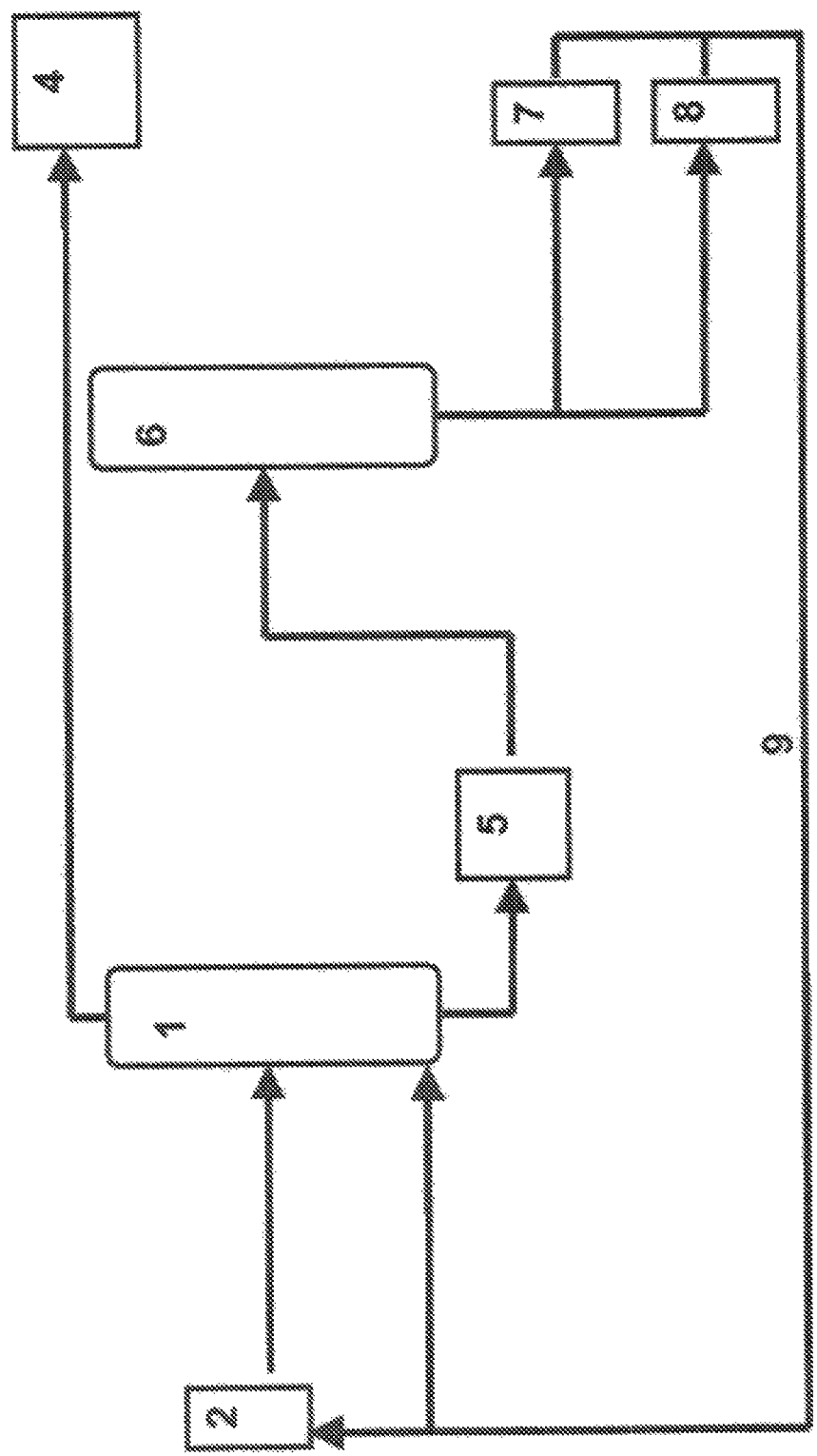
FIG. 2 shows a flowchart of one embodiment of the method in accordance with the invention.

FIG. 2 shows the course of the method in accordance with the invention. A process oil 5 with a high polycyclic aromatic content, as obtained, for example from the method shown in FIG. 1, is sent to a hydrogenation reactor 6 and hydrogenated there with hydrogen. A naphthenic process oil 7 and stripping oil 8 are taken from the hydrogenation reactor 6. The naphthenic process oil 7 has a PCA content below 3 wt %. In a less preferred embodiment, the method can also be conducted so that end products with a relatively high residual content of aromatics, the PCA content of which can be >3 wt % in accordance with IP 346, are obtained. These relatively high-aromatic fractions can be added via line 9 to the primary extract 2 or, alternatively, can be sent to the extraction column 1 and are suitable as feedstock for the production of label-free process oils either by itself or in a mixture with primary extract.

Figure 3:
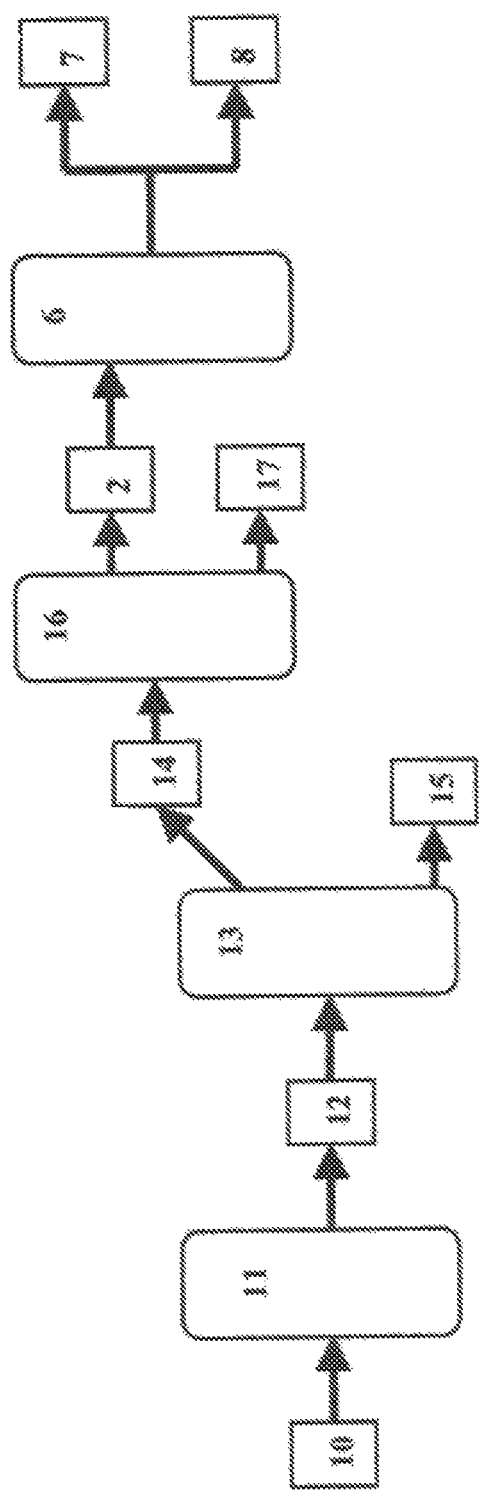
FIG. 3 shows a flowchart of another embodiment of the method in accordance with the invention.

FIG. 3 shows the production of a naphthenic process oil 7 by direct hydrogenation of a primary extract 2 in a hydrogenation reactor 6. In addition to the naphthenic process oil 7, a stripping oil 8 is obtained. A crude oil 10 is subjected to atmospheric distillation 11. The resulting atmospheric residue 12 is solely processed further in a vacuum distillation 13. A distillate 14 and a vacuum residue 15 are obtained. The distillate 14 is separated into the primary extract 2 and a raffinate 17 in an extraction column 16.

EXAMPLES

Example 1

A secondary extract with a polycyclic aromatic content of 45 wt % according to IP 346 and $C_N$ content of 22 wt % and $C_P$ content of 23 wt % was input with hydrogen to a hydrogenation reactor at a temperature of 340° C. and pressure of 200 bar. The reactor contained a nickel-molybdenum catalyst (Axens HR548, Evonik). Hydrogenation was carried out at an average residence time of 25 min. 94% naphthenic process oil and 6% stripping oil were obtained.

The resulting naphthenic process oil has the properties given in Table 1.

TABLE 1

Properties of resulting naphthenic process oil from Example 1

|  | Properties of process oil in accordance with Example |
|---|---|
| Benz[a]pyrene [ppm] | <1 |
| Sum PAH [ppm] measured by RL 2005/69 EC | <10 |
| Viscosity at 40° C. [mm²/s] | 612 |
| Viscosity at 100° C. [mm²/s] | 39 |
| $C_A$ according to ASTM D 2140 [wt %] | 3 |
| $C_N$ according to ASTM D 2140 [wt %] | 57 |
| $C_P$ according to ASTM D 2140 [wt %] | 40 |
| Aniline point [° C.] | 93 |

Example 2

In addition, the properties of different products that [were] obtained by the method in accordance with the invention were compared with those of a traditional process oil TDAE. Table 2 shows a comparison of the different production conditions and data for three products produced in accordance with the invention (hydrogenation products) in a comparison with a TDAE. The hydrogenation products were prepared analogously to the example described above. The mixture of primary extract to secondary extract was 50:50.

TABLE 2

Production conditions and properties of process oils produced in accordance with the invention and a comparison process oil

|  | Method of determination | Vivatec ® 500 (TDAE) | Hydrogenation products from primary extract (DAE) | Hydrogenation products from primary/secondary extract mixture | Hydrogenation products from secondary extract |
|---|---|---|---|---|---|
| Catalyst |  | Vivatec ® 500 (TDAE) | Axens HR 548 A1024 | Axens HR 548 A1024 | Axens HR 548 A1024 |
| Reaction temperature [° C.] |  |  | 310 | 330 | 350 |
| Pressure [bar] |  |  | 200 | 200 | 200 |
| Residence time [min] |  |  | 18 | 18 | 16 |
| DMSO extract [%] | IP 346 | 2.6 | 2.8 | 2.9 | 2.8 |
| Benzo-(a)pyrene [ppm] | GC-MS | 0.4 | 0.3 | 0.1 | 0.5 |
| Total PAH [ppm] | GC-MS | 5.7 | 2.5 | 3.1 | 4.2 |
| Viscosity at 100° C. [mm²/s] | DIN 51562 T. 1 | 21.1 | 19.1 | 12.6 | 20.8 |
| Sulfur [%] | DIN EN ISO 14596 | 1.03 | 0.15 | 0.12 | 0.10 |
| CA [%] | DIN 51378 | 25 | 24 | 25 | 24 |
| CN [%] | DIN 51378 | 30 | 33 | 42 | 48 |
| CP [%] | DIN 51378 | 45 | 44 | 33 | 28 |
| AP [° C.] | DIN ISO 2977 | 70 | 70 | 64 | 61 |

The process oils that were obtained were worked into compounds (rubber mixtures). The composition of the compounds can be seen from Table 3.

TABLE 3

Composition of compounds

| Raw material | Product, manufacturer | Comparison | Example 2a | Example 2b | Example 2c |
|---|---|---|---|---|---|
| Buna VSL 5025-0 HM | SSBR, Lanxess | 70 | 70 | 70 | 70 |
| Buna CB 24 | NdBR, Lanxess | 30 | 30 | 30 | 30 |
| Ultrasil 7000 GR | Silica, Evonik | 80 | 80 | 80 | 80 |
| SI 75 | Silane, Evonik | 5.8 | 5.8 | 5.8 | 5.8 |
| Corax N 223 | Soot, Evonik | 10 | 10 | 10 | 10 |
| Vulkanox 4020/LG | 6PPD, Lanxess | 1 | 1 | 1 | 1 |
| Vulkanox HS/LG | TMQ, Lanxess | 1 | 1 | 1 | 1 |
| Rotsiegel zinc white | ZnO, Grillo | 3 | 3 | 3 | 3 |
| Stearic acid | | 1 | 1 | 1 | 1 |
| Vulkacit D/C | Sulfenamide, Lanxess | 2 | 2 | 2 | 2 |
| Vulkacit CZ/C | Sulfenamide, Lanxess | 1.5 | 1.5 | 1.5 | 1.5 |
| Sulfur | | 1.8 | 1.8 | 1.8 | 1.8 |
| Vivatec 500 | TDAE oil, H&R | 37.5 | | | |
| Hydrogenation products from primary extract | | | 37.5 | | |
| Hydrogenation products from primary/secondary extract mixture | | | | 37.5 | |
| Hydrogenation products from secondary extract | | | | | 37.5 |

The compounds were vulcanized and the properties of the resulting vulcanizates were measured. These are given in Table 4.

TABLE 4

Hardness, rebound elasticity, delta tangent and wear of resulting vulcanizates

| | | Comparison | Example 2a | Example 2b | Example 2c |
|---|---|---|---|---|---|
| Hardness A/D | Shore A hardness at 23° C. | 60 | 62 | 61 | 61 |
| Standard | Shore A hardness at 70° C. | 59 | 59 | 60 | 54 |
| Rebound elasticity | R (23° C.) | 33.5 | 32.2 | 31.5 | 30.8 |
| | R (70° C.) | 55 | 54 | 55 | 57 |
| Tensile test Bar S2 | Breaking elongation: | 440 | 425 | 405 | 385 |
| | Breaking stress: | 18.5 | 18.1 | 17.9 | 17.6 |
| Tangent delta | 0° C. | 0.52 | 0.50 | 0.47 | 0.48 |
| | 60° C. | 0.13 | 0.13 | 0.12 | 0.11 |
| Wear | DIN 53516 wear | 102 | 105 | 108 | 109 |

It turns out that through the hydrogenation of the said raw materials process oils are obtained that have values that are absolutely comparable to a TDAE. One can see that with an increase of the NAP content the rolling resistance (tangent delta @ 60° C.) becomes better with an increase of the NAP content, while wear and wet slip resistance (tangent delta @ 0° C.) become better with a decrease of the NAP content. This puts the user in a position to be able to adjust the said key properties selectively and not just in the case of tires. Such adjustment up to now was not possible with the traditional process oils.

The invention claimed is:

1. A method for producing naphthenic process oils that have a carbon distribution CA to CN to CP of 0-30 wt % to 30-65 wt % to 20-55 wt %, determined in according with ASTM D 2140, wherein the process oil starting material has a content of naphthenic carbon atoms CN less than or equal to 25% wt %, wherein a process oil educt is hydrogenated with hydrogen using a metal catalyst at a temperature between 200-400° C. and at a pressure between 80-250 bar, wherein the process oil educt is selected from the group consisting of distillate aromatic extract (DAE), secondary extracts obtained in production of TDAE or MES, educt mixture of DAE and secondary extracts, and mixtures thereof.

2. The method of claim 1, wherein the metal catalyst is based on a nickel, cobalt, molybdenum, chromium, vanadium, nickel-molybdenum, chromium-vanadium, a metal oxide, a metal sulfide, or a mixture thereof.

3. The method of claim 1, wherein the average residence time of the hydrogenation is 6-60 minutes.

4. The method of claim 1, wherein the aniline point of the naphthenic process oil is between 30 and 115°, determined in accordance with DIN ISO 2977.

5. The method of claim 1, wherein hydrogenation is carried out at a temperature between 300-375°.

6. The method as in claim 1, wherein the mixture is 75 wt % to 25 wt % up to 25 wt % to 75 wt % secondary extract to DAE.

\* \* \* \* \*